Patented Nov. 25, 1941

2,263,606

UNITED STATES PATENT OFFICE 2,263,606

BASIC CALCIUM SILICATE PIGMENT, ITS METHOD OF PREPARATION, AND COMPOSITIONS CONTAINING THE SAME

Ladislaus Balassa, Flint, Mich., assignor to E. I. du Pont de Nemours & Company, Wilmington, Del., a corporation of Delaware No Drawing. Application November 3, 1939, Serial No. 302,716

5 Claims. (Cl. 106—241)

This invention relates to pigment coating compositions and more particularly to certain calcium silicate pigments. Heretofore nearly every conceivable inorganic material has been proposed or used as a pigment, but due to inherent faults in most of them, only a relatively few are satisfactory, and unfortunately these are relatively expensive.

It is therefore, an object of this invention to produce a new and useful pigment from very cheap material. It is also an object to produce stable pigments which are slightly basic in character and are capable of forming moisture resistant soaps with the acids usually present in paint and varnish vehicles. A still further object is to produce a basic pigment which is capable of neutralizing the acidic decomposition products of drying oils to form compounds therewith which are practically insoluble in water. Other objects are the preparation of various coating compositions containing such pigments. Still other objects will appear as the description of the invention proceeds.

These objects are accomplished by reacting lime and silica in certain molecular proportions by heating them just below the sintering point for about seven or eight hours. The invention will become more readily understood from the following description.

I have found that certain basic calcium silicates are particularly suitable as pigments since they are only slightly but definitely soluble in water and do not contain more than a fraction of a percent of water soluble impurities. They also have the ability to neutralize all paint vehicles as well as the acid by-products of the oxidation of the drying oils by forming calcium soaps and salts, respectively, which are practically insoluble in water. Furthermore, the pigment does not saponify oils or resins to any adverse degree. The pigment may also be ground in most acid vehicles and not cause gelling or excessive bodying of the finished paint even on prolonged storage. This difficulty is very serious with many basic pigments.

The pigments prepared according to the present invention act as buffers and keep the pH of the wet paint as well as the dry film on the basic side. Paints so produced are particularly suitable when exposed to acid fumes such as are encountered in the neighborhood of sulphuric acid plants. Pigments so prepared are also easily ground to a smooth powder free from grit and lumps.

In general, basic calcium silicates suitable for use as pigments according to this invention are prepared by heating lime and silica to temperatures sufficiently high and for a time sufficiently long to effect an essentially complete conversion to calcium silicate. The degree of basicity of the pigment is controlled by the ratio of lime to silica and for most purposes this will fall between 1 and 3 mols of CaO for each mol of $SiO_2$. For most purposes, however, I prefer to operate between 1½ to 2 mols of CaO to 1 mol of $SiO_2$. If the ingredients are heated to a fusion point, calcium silicate is formed, but the fused materials on cooling freeze to glassy lumps and cannot be ground by ordinary means sufficiently fine and free from grit to make its use feasible as a pigment. I have found, however, that if lime, whether hydrated or dehydrated, is heated with silica in the pulverized form to temperatures above 1000° C. but still below the fusion point of either of the ingredients, an essential complete solid reaction between the ingredients takes place and any slight residual alkali is not objectionable for the reasons given above. The calcium silicate so prepared is suitable for use in paint compositions without previous pulverizing or grinding. The invention will be more readily understood by the following examples which are given by way of illustration, and it will be obvious that modifications can be made without departing from the spirit of the invention.

Example I

|  | Pounds |
|---|---|
| 1½ mols calcium oxide, pulverized | 841.0 |
| 1 mol silicon dioxide, pulverized | 600.6 |

These materials are mixed thoroughly, and then charged into a preheated rotary pigment calciner. The temperature is then rapidly raised to between 1100° C. and 1200° C. and is held at this temperature for about 7½ hours after which the material is discharged from the calciner in the form of very hard balls ranging in size from 1 to 3 inches in diameter. On cooling, however, these balls crumble to a fine powder which is substantially calcium silicate with less than .8% of free CaO.

Example II

| | Pounds |
|---|---|
| 2 mols calcium oxide, pulverized | 1121.6 |
| 1 mol silicon dioxide, pulverized | 600.6 |

These materials in the well pulverized form are charged into a rotary pigment calciner which has been preheated to about 1200° C. The charge is heated until the mass has reached a temperature of 1260° C. to 1290° C. and is maintained at this temperature for about 7 hours. The mass is then discharged from the calciner and treated as other pigments with or without grinding before incorporation into the vehicle.

It will be understood that calcium compounds other than the oxide may be used such as calcium carbonate, hydroxide, or oxalate, although I prefer to use the oxide or carbonate due to the lower cost. It has also been found that the silicon dioxide may be replaced for certain purposes by various clays containing silicates of aluminum, magnesium and iron, although these do not represent my preferred embodiment. In any case they should not be heated to the fusion or sintering point, and sufficient lime must be added to provide more than 1 mol for each mol of $SiO_2$ and at least 1 mol of lime for each mol of $Al_2O_3$ or its equivalent. In any case, whether silica or other oxide is used, the ratio between the CaO and acid component should be between 1 and 3 mols of lime to each mol of silica, and the silicates formed must be of a higher order than mono-calcium silicate, but lower than tri-calcium silicate, although under such conditions where considerable basicity is required, this latter may be prepared to contain a slightly greater amount of free calcium oxide. The preferred ratio, however, is 1½ mols of CaO to each mol of $SiO_2$.

With respect to temperature, it has been found that 1260° C. represents the optimum, although satisfactory pigments may be obtained by heating the ingredients between 1000° C. and 1300° C for a sufficient time. The time limitations depend mainly on the operating temperature and the particle size of the raw materials employed, as well as the degree of intimacy with which they are blended. The correct time may be determined by frequent analysis of the charge, and when the content of free CaO drops below .8%, the reaction is sufficiently complete for most purposes. The heating of the mass, however, should not be maintained for a time such that the free CaO content drops below .3%, since at this point the calcium silicate crystals begin to show an undesirable increase in size and are not suitable for use as a pigment without grinding. The preferred end point is when the charge contains about .7% or slightly less of free CaO. If the temperature is carried out at the fusion point, the charge becomes glassy on cooling and is not satisfactory. It will be understood that the rate of reaction may be increased if desired by treating the charge with steam, hydrochloric acid, or chlorides.

It is well known that Portland cement may be prepared by calcining lime, alumina, and silica, but in this process the ingredients are fused and are not satisfactory for pigments even when ground for many hours. The following examples illustrate the use of pigments prepared according to my invention in typical vehicles, although it will be understood that these are given merely by way of illustration since these pigments have a very broad adaptability for various vehicles.

The following examples of typical compositions are included by way of illustration and not as a limitation:

Example III

Gray primer surfacer:

| | Parts by weight |
|---|---|
| Resin A solution | 26.0 |
| Basic calcium silicate | 6.0 |
| Calcined magnesium silicate | 40.0 |
| Titanium dioxide | 5.0 |
| Xylol | 22.6 |
| Lead naphthenate solution | .2 |
| Manganese naphthene solution | .2 |
| | 100.0 |

The calcined magnesium silicate for the above composition was obtained through calcination of asbestine pulp at 1000° C., for two hours, in a rotary calciner.

Example IV

White primer surfacer:

| | Parts by weight |
|---|---|
| Resin A solution | 20.9 |
| Basic calcium silicate | 5.4 |
| Pyrophyllite | 28.7 |
| Lithopone | 19.5 |
| Xylol | 25.1 |
| Lead naphthenate solution | .2 |
| Manganese naphthenate solution | .2 |
| | 100.0 |

The basic calcium silicate used in Examples III and IV was obtained by co-calcining $SiO_2$ and CaO in proportions of one mol of $SiO_2$ to one and one half mols of CaO. The calcination was carried out in a rotary calciner at 1200° C.

Resin A solution used in Examples III and IV was formed from the following ingredients, using the proportions indicated:

| | Parts by weight |
|---|---|
| Phthalic anhydride | 19.99 |
| Glycerol | 8.72 |
| Litharge | .03 |
| Linseed oil | 28.74 |
| High solvency petroleum naphtha | 42.52 |
| | 100.00 |

The lead naphthenate solution contains 16% Pb. The manganese naphthenate solution contains 3% Mn.

Example V

Oxide primer surfacer:

| | Parts by weight |
|---|---|
| Varnish A | 32.4 |
| Basic calcium silicate | 5.3 |
| Calcined magnesium silicate | 25.9 |
| Barytes | 12.4 |
| Talc | 3.8 |
| Iron oxide | 5.3 |
| Petroleum naphtha (V. M. & P.) | 14.5 |
| Lead naphthenate solution (16% Pb) | .2 |
| Manganese naphthenate solution (3% Mn) | .2 |
| | 100.0 |

The basic calcium silicate for this composition was obtained by co-calcining $SiO_2$ and CaO in proportions of one mol of $SiO_2$ and two mols of CaO. The calcination was carried out in a rotary calciner at 1240° C.

For the calcined magnesium silicate one may use in the above composition either talc calcined at 1100° C. for two hours or asbestine calcined 1000° C. for two hours.

Varnish A was formed from the following ingredients, using the proportions indicated.

|  | Parts by weight |
|---|---|
| Congo copal | 14.3 |
| Glycerol | .7 |
| Heat bodied linseed oil | 35.0 |
| Mineral spirits | 50.0 |
|  | 100.0 |

Example VI

Gray dipping enamel:

|  | Parts by weight |
|---|---|
| Resin B | 45.6 |
| Iron naphthenate solution (6% Fe) | .5 |
| Basic calcium silicate | 5.0 |
| Lithopone | 32.0 |
| Lamp black | 9.3 |
| High solvency petroleum naphtha | 7.6 |
|  | 100.0 |

Resin B was formed from the following ingredients using the proportions indicated:

|  | Parts by weight |
|---|---|
| Linseed oil | 27.59 |
| Glycerol | 7.13 |
| Litharge | .03 |
| Phthalic anhydride | 16.76 |
| Petroleum solvent naphtha | 48.49 |
|  | 100.00 |

Example VII

Oxide dipping primer:

|  | Parts by weight |
|---|---|
| Varnish B | 45.6 |
| Iron naphthenate solution (6% Fe) | .5 |
| Basic calcium silicate | 5.0 |
| Iron oxide | 32.0 |
| Lamp black | 9.3 |
| Oleum spirits | 7.6 |
|  | 100.0 |

Varnish B was formed from the following ingredients using the proportions indicated:

|  | Parts by weight |
|---|---|
| Rosin | 14.98 |
| Calcium hydrate | .60 |
| Linseed oil (heat bodied) | 35.21 |
| Mineral spirits | 49.21 |
|  | 100.00 |

The basic calcium silicate used in Examples VI and VII was obtained by co-calcining $SiO_2$ and CaO, in proportions of one mol of $SiO_2$ to one and one half mols of CaO, for six hours at 1200° C.

The coating compositions set forth above, as well as other coating compositions falling within the scope of the present invention, are prepared by grinding or dispersing the pigment combinations with the resin or varnish in the presence of sufficient solvent to provide a consistency suited to the dispersing device used. After dispersion, the paint is reduced to application consistency with additional solvent. The naphthenate driers may be added at any desired point in the preparation of the coating composition.

Where desired extenders, prime pigments or other basic pigments, such as blanc fixe, silica, asbestine, whiting, china clay, lead chromate, zinc chromate, zinc oxide, white lead, etc., may be incorporated in the coating composition falling within the scope of the present invention.

The polyhydric alcohol-polybasic acid resins referred to above may be made in any well-known manner as, for example, by heating the ingredients at any suitable temperature above the melting point of the materials until resinification is complete. If desired, refluxing or partial refluxing may be resorted to or the operation may be carried out at elevated or reduced pressures.

In general, it is advisable to maintain the acid number of the resin at the lowest possible value and this is usually accomplished by increasing the temperature or the period of heating, but stopping before the gel point is reached. The allowable range of acid numbers will vary with the type of pigments used. In general, more stable products will be obtained if the acid number is held below 20 than when it is above this figure.

By the term "modified polyhydric alcohol polybasic acid resin" as used herein, I mean the resinous condensation product resulting from the reaction of one or more polyhydric alcohols and one or more polybasic acids, with one or more of the following modifying ingredients: drying oils, semi-drying oils, synthetic drying oils, and monobasic acids, especially those derived from drying oils, synthetic drying oil acids and mixtures of one or more of these modifying ingredients with natural resins as well as other equivalent products.

I found that the optimum results could be obtained, for the purpose of this invention, with polyhydric alcohol polybasic acid resins in which the oil modifier did not fall below 35% and did not exceed 70% of resin composition. Resins other than the above, however, may also be pigmented with pigment combinations containing basic calcium silicate and fall within the scope of this invention.

The varnishes referred to above may be made by any manner known to the art. For example, by heating the ingredients at any suitable temperature above the melting points of the ingredient until a homogenous product of the desired dry and physical properties is obtained. If desired the gum may be run first or the oil may be bodied, as the case may be.

The term resin as used herein includes either a natural resin, like rosin, congo, East India, dammar, etc., or a synthetic or semi-synthetic resinous product like Bakelite, amberol, indene, chlorinated rubber, etc. By the term oil, I mean: drying oils, semi-drying oils and synthetic drying oils.

I found that for the purpose of this invention, optimum results are obtained where the oil-to-gum ratio does not fall below 35% oil to 65% gum and does not exceed 70% oil to 30% gum, although vehicles with a higher oil content or even straight oils without gum fall within the scope of this invention.

The term "basic calcium silicate" as used herein designates a group of compounds having as their main components calcium oxide and silica chemically combined in proportions of more than one mol but not exceeding three mols of CaO to each mol of $SiO_2$. The compounds are obtained by co-calcining silica or silicates with lime or with suitable calcium compounds which yield CaO in the calciner. I found that calcination temperatures of around 1200° C. to 1300° C. produce compounds free of uncombined lime and with the optimum properties for coating compositions.

The pigment herein disclosed is non-toxic and is effective in preventing the moisture peeling of undercoats on sheet metal and in these two respects have a distinct advantage over lead compounds. They likewise show superiority over zinc oxide in many respects since the latter has relatively poor moisture peeling resistance in air dried films and likewise yields a film which is somewhat brittle. Moreover, zinc oxide films if exposed to moisture for a few days usually result in rapid failure. Likewise, sulfuric acid, present in the vicinity of coal burning heating plants, converts zinc oxide into zinc sulfate, which is not resistant to moisture. The pigments herein disclosed have the advantage over these compounds in that they are relatively insoluble and form practically insoluble compounds with oil acids.

It is apparent that many widely different embodiments of this invention may be made without departing from the spirit and scope thereof, and therefore, it is not intended to be limited except as indicated in the appended claims.

I claim:

1. The process of manufacturing calcium silicate pigments which comprises heating a pulverulent mixture composed essentially of 1 to 3 mols of calcium oxide and 1 mol of silica at a temperature between about 1000° C. and 1300° C. until the free calcium oxide content is between about 0.3 per cent and 0.8 per cent and then discontinuing the heating.

2. The process of manufacturing calcium silicate pigments which comprises heating in pulverulent form a mixture in the ratio of from 1 to 3 mols of calcium oxide with 1 mol of $SiO_2$ at a temperature between about 1000° C. and 1300° C. for about 7 hours and until the free calcium oxide content is between about 0.3 per cent to 0.8 per cent.

3. The process of claim 1 in which the temperature is about 1200° C.

4. A calcium silicate pigment having a free calcium oxide content between about 0.3 per cent and 0.8 per cent in the pulverulent form prepared according to claim 1.

5. A resinous coating composition comprising as the vehicle a resin which yields acid decomposition products and a pigment prepared by heating a pulverulent mixture of 1 to 3 mols of calcium oxide and 1 mol of silica at a temperature between about 1000° C. and 1300° C. until the free calcium oxide content is between 0.3 and 0.8 per cent.

LADISLAUS BALASSA.